United States Patent
Phadke

(10) Patent No.: US 10,235,062 B1
(45) Date of Patent: *Mar. 19, 2019

(54) SELECTION OF COMPUTER RESOURCES TO PERFORM FILE OPERATIONS IN A POWER-EFFICIENT MANNER

(71) Applicant: Veritas Technologies LLC, Mountain View, CA (US)

(72) Inventor: Dhanashri Phadke, Roseville, MN (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,651

(22) Filed: Oct. 31, 2016

Related U.S. Application Data

(63) Continuation of application No. 14/041,608, filed on Sep. 30, 2013, now Pat. No. 9,519,522.

(51) Int. Cl.
  *G06F 9/46* (2006.01)
  *G06F 3/06* (2006.01)
  *G06F 1/3246* (2019.01)

(52) U.S. Cl.
  CPC .......... *G06F 3/0619* (2013.01); *G06F 1/3246* (2013.01); *G06F 3/065* (2013.01); *G06F 3/067* (2013.01)

(58) Field of Classification Search
  None
  See application file for complete search history.

(56) References Cited

U.S. PATENT DOCUMENTS

| | | | | |
|---|---|---|---|---|
| 8,200,586 | B2 * | 6/2012 | Alam | G06Q 30/04 717/177 |
| 8,612,984 | B2 * | 12/2013 | Bell, Jr. | G06F 9/5094 713/320 |
| 9,069,890 | B2 * | 6/2015 | Kaiser | G06F 11/3442 |
| 2012/0185710 | A1 * | 7/2012 | Gellerich | G06F 1/3203 702/61 |
| 2012/0239739 | A1 * | 9/2012 | Manglik | G06F 9/5077 709/203 |

* cited by examiner

*Primary Examiner* — Bing Zhao
(74) *Attorney, Agent, or Firm* — Campbell Stephenson LLP

(57) ABSTRACT

Various systems and methods for selecting resources (such as of a distributed storage system) for performing file operations (such as backup operations) based on power-usage characteristics of these resources. For example, one method involves receiving an input, where the input identifies a process to be performed. The method also involves accessing power data, where the power data indicates power usage for the process as performed using one or more resources of a plurality of resources. The method also involves selecting, using one or more processors, a selected resource from the resources based, at least in part, on the power data.

22 Claims, 10 Drawing Sheets

SELECTION OF COMPUTER RESOURCES TO PERFORM FILE OPERATIONS IN A POWER-EFFICIENT MANNER

CROSS-REFERENCE TO RELATED APPLICATIONS

The present patent application is a continuation of U.S. patent application Ser. No. 14/041,608, filed on Sep. 30, 2013, entitled "Selection of Resources for Power-Efficient File Operations," which is incorporated by reference herein in its entirety and for all purposes.

FIELD OF THE INVENTION

This application relates to distributed storage systems. Particularly, this application relates to selecting resources for power-efficient file operations.

BACKGROUND OF THE INVENTION

As businesses increasingly rely on computers for their daily operations, managing the vast amount of business information generated and processed has become a challenge. Most large businesses have a wide variety of application programs managing large volumes of data stored on many different types of storage devices across various types of networks and operating system platforms. These storage devices can include tapes, disks, optical disks, and other types of storage devices.

Storage area networks (SANs) including hundreds of storage devices can be used to provide storage for hosts. SANs offer a variety of topologies and capabilities for interconnecting storage devices, subsystems, and server systems. A variety of interconnect entities, such as switches, hubs, and bridges, can be used to interconnect these components. These varying topologies and capabilities allow storage area networks to be designed and implemented that range from simple to complex configurations.

Performing various operations on the vast amount of data stored by such distributed storage systems use power, as various components of such distributed storage systems consume power to operate. Thus, accompanying this flexibility in distributed storage is the complexity of managing a large number of devices, including their power consumption.

BRIEF DESCRIPTION OF THE DRAWINGS

The embodiments of the present application may be better understood, and its numerous objects, features, and advantages made apparent to those skilled in the art by referencing the accompanying drawings.

Figure 1:
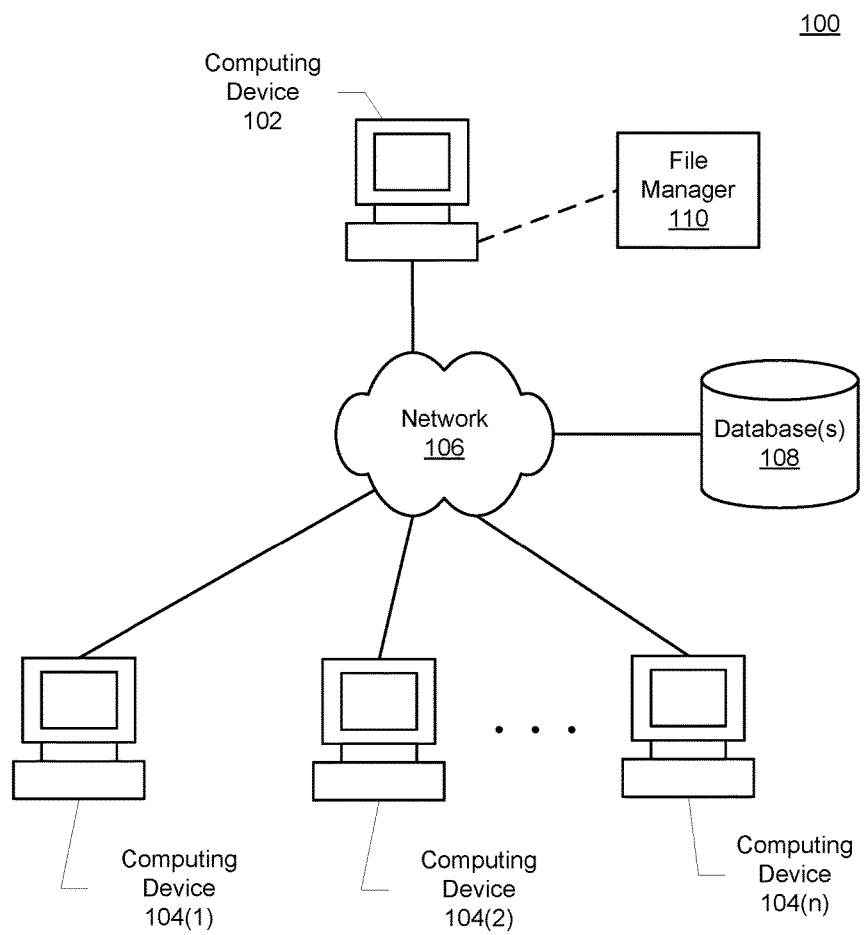
FIG. 1 is a block diagram illustrating a distributed storage system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Embodiments of the present application are directed to systems and methods for automatically selecting resources (such as of a distributed storage system) for performing file operations (such as backup operations) based on power-usage characteristics of these resources. For example, one method involves receiving an input, where the input identifies a process to be performed. The method also involves accessing power data, where the power data indicates power usage for the process as performed using one or more resources of a plurality of resources. The method also involves selecting, using one or more processors, a selected resource from the resources based, at least in part, on the power data. Example systems for implementing these methods are shown in the following Figures, including FIG. 1.

FIG. 1 shows a system 100 that includes computing device 102 that is coupled to computing devices 104(1)-104(n) via network 106. Each of computing devices 102 and 104(1)-104(n) can be implemented using any type of a computer, such as a personal computer, a workstation, a server device, a mobile device (e.g., a smart phone, a tablet computer, a smart watch), and/or other type of a device having one or more processors and a memory. One or more of computing devices 102 and/or 104 can also communicate data (such as power or process data) over a network 106 to and/or from databases(s) 108. Furthermore, computing device 102 can initiate, such as via a file manager 110, one or more file processes, such as backup operations, to be performed on data that is accessed by computing devices 104.

Network 106 can include a WAN (Wide Area Network), such as the Internet, one or more LANs (Local Area Networks), and/or one or more SANs (Storage Area Networks). In some embodiments, network 106 includes one or more network devices, such as routers, switches, and the like, used to facilitate transmission of data between the various computing devices.

File manager 110 can initiate a file process, such as a backup operation for backing-up data that is accessed by computing device 102 and/or 104. The data to be backed-up can be located locally to computing device 102 and/or distributed over one or more computing devices 104. In one embodiment, file manager 110 (and any supporting modules) that initiates such file processes can be distributed among computing device 102 and/or computing devices 104. File manager 110 can interact with and/or include various components, such as described below with reference to FIGS. 2 and 3.

Upon receiving a request to initiate a backup process, file manager 110 can automatically determine resources for performing this backup process. File manager 110 can access power data to support this determination. This data can include, for example, historical, average, and/or projected electricity and/or power use for each hardware and/or software resource. The power data can also include various parameters of the hardware and/or software resources, such as CO2 emissions, performance parameters (e.g., expected speed of completion), a number of disks, servers, software applications used, and the like. The power data can also include data that can be used to calculate a projected cost of performing the desired process, such as cost of electricity depending on time-of-the-day (as well as per location, as various locations may have different electricity rates). This data can be accessed by accessing database(s) 108.

File manager 110 can then determine which software application(s) to use to perform the desired process. The selection of the application(s) can be also determined based on the type, number, and or location of selected hardware resources(s). File manager 110 can determine which hardware resource(s) to use for this process. For example, file manager 110 can determine to use computing device 104(1) as a server (for executing a chosen application), and one or more media devices (such as hard drives) that are located at computing device 104(2). File manager 110 can also determine to use a certain backup software application (to be executed by computing device 104(1)).

Figure 2:
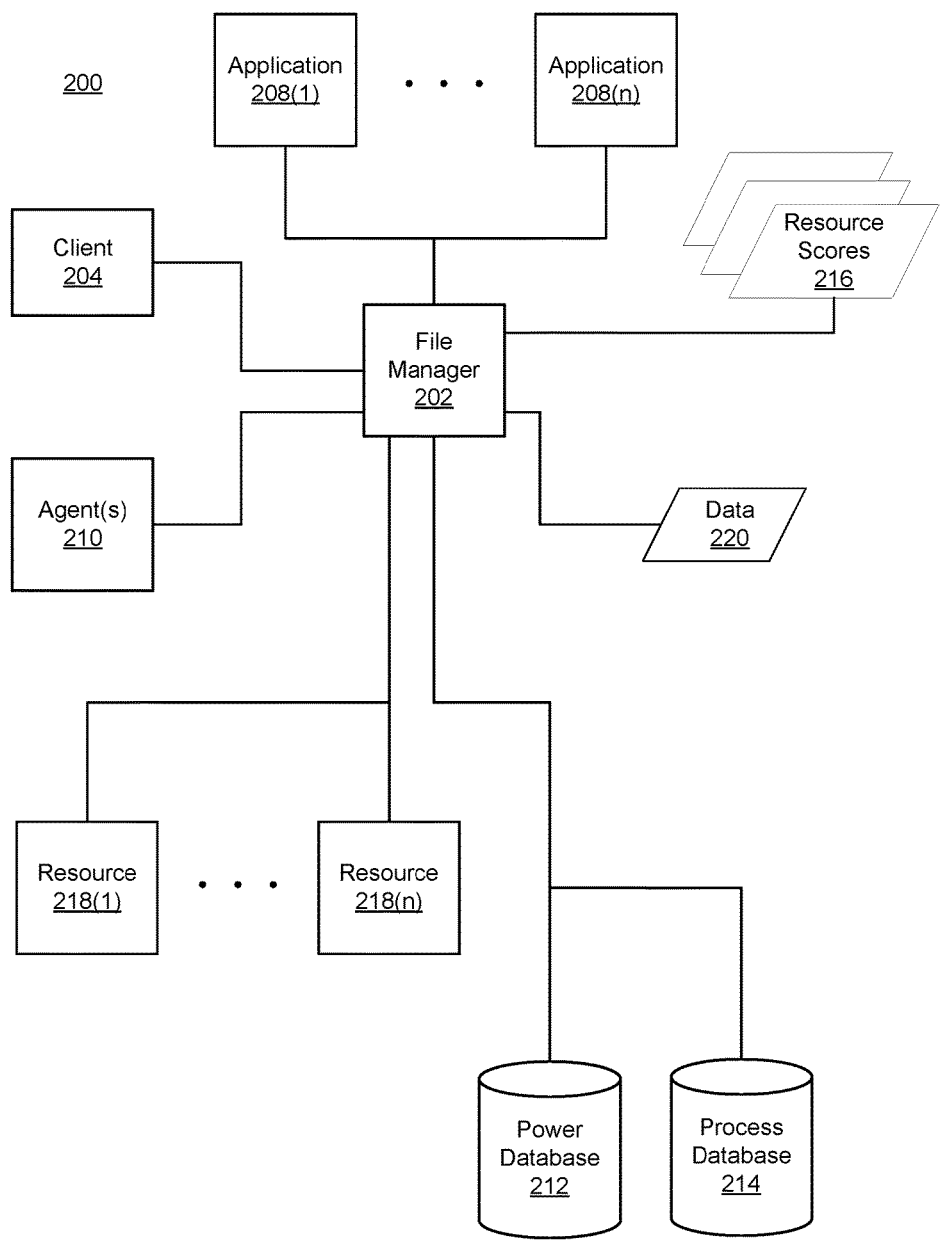
FIG. 2 is a block diagram illustrating various components of a power selection system, according to one embodiment.

FIG. 2 is a block diagram 200 that illustrates a portion of the distributed storage system of FIG. 1, according to some embodiments. FIG. 2 illustrates a file manager 202 that automatically selects software and hardware resources to be used for a file system operation, such as for a backup operation. File manager 202 can receive a request to perform a file process, such as a backup operation. This request can be received from a client 204, which can be a software application or a system administrator. In one implementation, the request is generated by a backup utility application that monitors the data usage and/or integrity of a distributed storage system. The request can indicate a certain file process, such as a backup operation, or another file operation.

Once file manager 202 receives the request, file manager 202 then accesses power data, such as by communicating with a power database 212 and/or a process database 214. File manager 202 then selects one or more resources (e.g., one or more of resources 218(1)-218(n)) based on the power data, such as by generating and ranking resources via resource score(s), although in other embodiments resource selection can be made without using resource scores. For example, instead of using resource scores, file manager 202 can select one or more resources based on rankings and/or other selection algorithms.

If the resource score approach is used, file manager 202 calculates one or more resource score(s) 216(1)-216(n) (e.g., one resource score for each resource), which indicate the power efficiency of each resource. The resource score can be calculated, e.g., by file manager 202, based on the accessed power data. File manager 202 can then use the resource score(s) to determine which resource(s) to use for performing the selected process. One embodiment of such score determination is described below with reference to FIG. 4B.

Regardless of the technique used, file manager 202 selects one or more of resources 218 based on the power data. For example, file manager 202 can determine to execute application 208(1) using computing device 218(1). It is noted that in some implementations, computing resources 218 already have at least one of applications 208 installed. In this case, the computing resource and the application are selected as one unit, e.g., computing resource 218(1) and application 208(1), computing resource 218(2) and application 208(2), and the like. File manager 202 also selects one or more media devices (such as hard drives), e.g., that are controlled by computing device 218(2).

File manager 202 can then schedule (or otherwise provision) execution of selected application(s) using the selected resource(s). In one implementation, file manager 202 can send instructions and/or commands to selected resources to initiate execution of selected application(s) using the selected resource(s). In another implementation, file manager 202 can queue (such as using a queue manager, not shown) the selected application(s) for execution on the selected hardware resource(s). Application 208(1) then can execute to perform a backup (e.g., a full backup) of data 220 (which can be located at another location, such as a client computing device) to the media devices of computing device 218(2).

In some embodiments, before or during execution of the selected application, one or more agent(s) 210 are provisioned on the selected resource(s). In other words, the agents can be provisioned (e.g., executed) in response to the selected process being performed. In one implementation, agent 210 can be implemented as a hardware element. Agent(s) 210 (when executing) can collect information related to the performance of the process on the resource(s). For example, one agent 210 can collect power consumption information for resource 218(1) as related to the backup process being performed. Agent 210 then transmits this collected data to file manager 202. File manager 202 can analyze and/or store the collected data in power database 212 and/or process database 214. It is noted that in some implementations, power database 212 and process database 214 are implemented as a single database. In one implementation, file manager 212 can also display a current element of power being used by the selected process.

Power database 212 stores portions of power data related to power uses of each resource. The power data can be indexed using hashes or order for faster access. The power data can indicate power efficiencies based on a resource being used with other resource(s). For example, power data for a server resource can indicate power efficiencies for that resource if used with a first type of storage media, and similarly, power efficiencies for that resource if used with other types of storage media. The power data can include historical, average, and/or projected electricity and/or power use for each hardware and/or software resource. The power data can also include various parameters of the resources, such as CO2 emissions for each process being performed by the respective hardware and/or software resource.

The power data can also include performance parameters, hardware characteristics (such as a number of disks, servers), software applications used in conjunction with each hardware resource, and the like. The power data can also indicate requirements on the time and/or amount of data that needs to be processed for a data backup. Furthermore, the power data can indicate power efficiencies based on the time of the day the resource is used. The power data can also indicate various requirements for various types of backup, such as a full backup, an incremental backup of a certain data size, and the like.

Process database 214 can store portions of power data related to requirements of each process, such as power requirements for a backup operation, and the like. Process database 214 can also store threshold data, such that indicates the maximum wattage used by each resource, a maximum permitted load on the overall system and/or per resource, etc. Process database can also indicate a maximum $CO_2$ threshold for each process/resource. The power data can thus be used to select resources to meet various power usage and/or $CO_2$ emission requirements that are imposed by cost cutting goals and/or regulatory restrictions.

Figure 3:
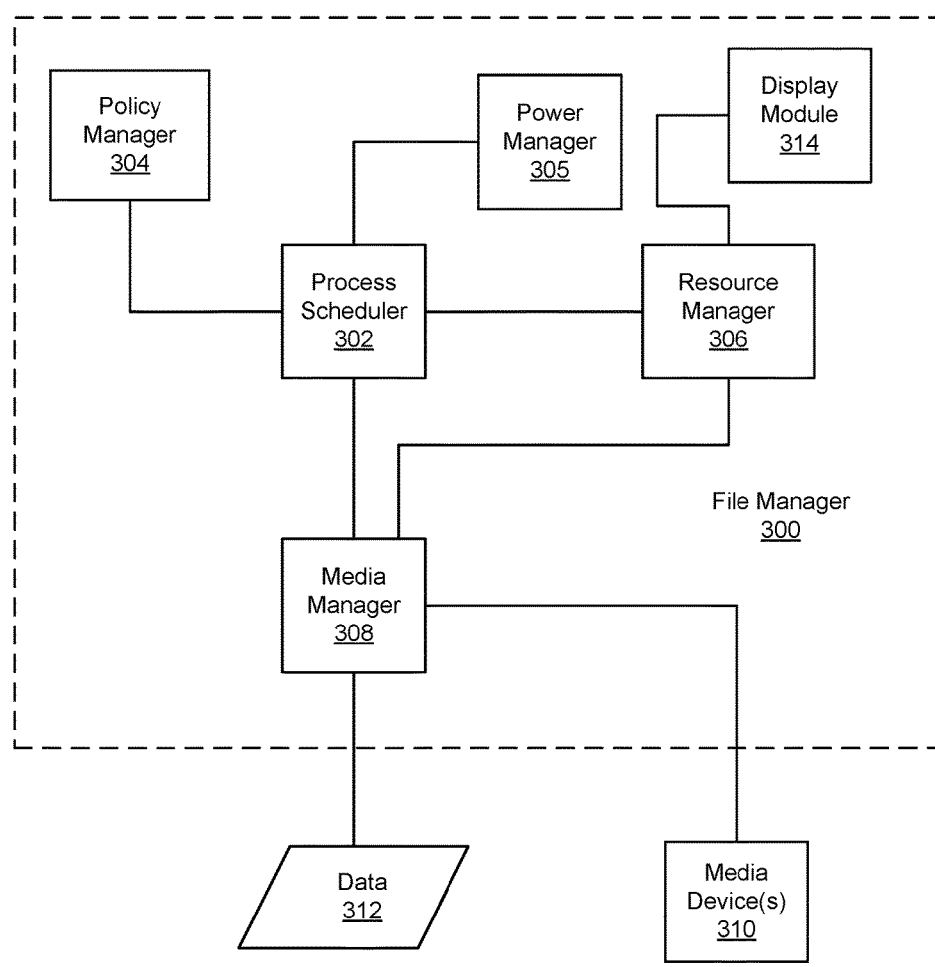
FIG. 3 is a block diagram illustrating example elements of a file manager, according to some embodiments.

FIG. 3 is a block diagram that illustrates one implementation of a portion of the distributed storage system of FIG. 2, according to some embodiments. FIG. 3 illustrates a file manager 300 (such as file manager 202). It is noted that one or more of the elements of FIG. 3 can be omitted or combined, as desired. Additional element(s) can also be used instead.

File manager 300 includes a process scheduler 302, a policy manager 304, a power manager 305, a resource manager 306, a media manager 308, and a display module 314. Policy manager 304 accesses policies from a policy manager 304. Policy manager 304 can determine whether a request indicates a selection of a power efficient policy or a regular policy. Policy manager 304 communicates this selected policy to process scheduler 302 and/or resource manager 306. A regular policy indicates that the resources (for performing the selected process) can be selected without accounting for power efficiency of the resources.

In this case, a resource manager 306 can select one or more resources for performing the process without regard to the power efficiency of the resource(s). For example, resource manager 306 can select a first available resource even if there are other more power-efficient resources available. In case the request indicates a power efficient policy, process scheduler 302 and resource manager 306 determine which software and/or hardware resources to use for performing the process. Examples of factors that can be considered in this regard are discussed in connection with FIG. 5. Furthermore, resource manager 306 can determine media device(s) 310 that are to be used by the process to read/write data to be processed (such as to access data to be backed-up.

Resource manager 306 also receives data from agents that indicate the power being used (also referred to as consumed power data) by the selected resources. The agents can send power data that indicates not only current power usage (e.g., by a selected server executing the selected application), but also other metrics such as power efficiency, load of the system, current $CO_2$ emissions, and the like. Resource manager 306 is configured to communicate at least a portion of the received consumed power data (or an analyzed version of this data, such as a current average power use) with display module 314. Display module is configured to display current power (or another metric, such as the $CO_2$ emissions) being used by the process, such as by each resource.

Power manager 305 accesses power data from one or more databases. The power data is communicated to process scheduler 302, which uses this data for determining the software and/or hardware resources. Power manager 305 also calculates consumed power by the selected process (e.g., as received from the agent(s) and/or resource manager 306) as performed using the selected resources. Power manager 305 also communicates with the databases to record the consumed power for the process.

Process scheduler 302 and resource manager 306 then communicate with a media manager 308. Media device(s) 310 can include one or more disk drives, tape drives, flash memory, and/or cloud storage, and the like. Media manager 308 determines data 312 on which to perform the selected process. For example, media manager 308 can determine, according to the request, the location of data that is to be backed up. Depending on the process type, media manager 308 can facilitate reading/writing/fetching of the determined portions data 312 to/from media device(s) 310.

Figure 4A:
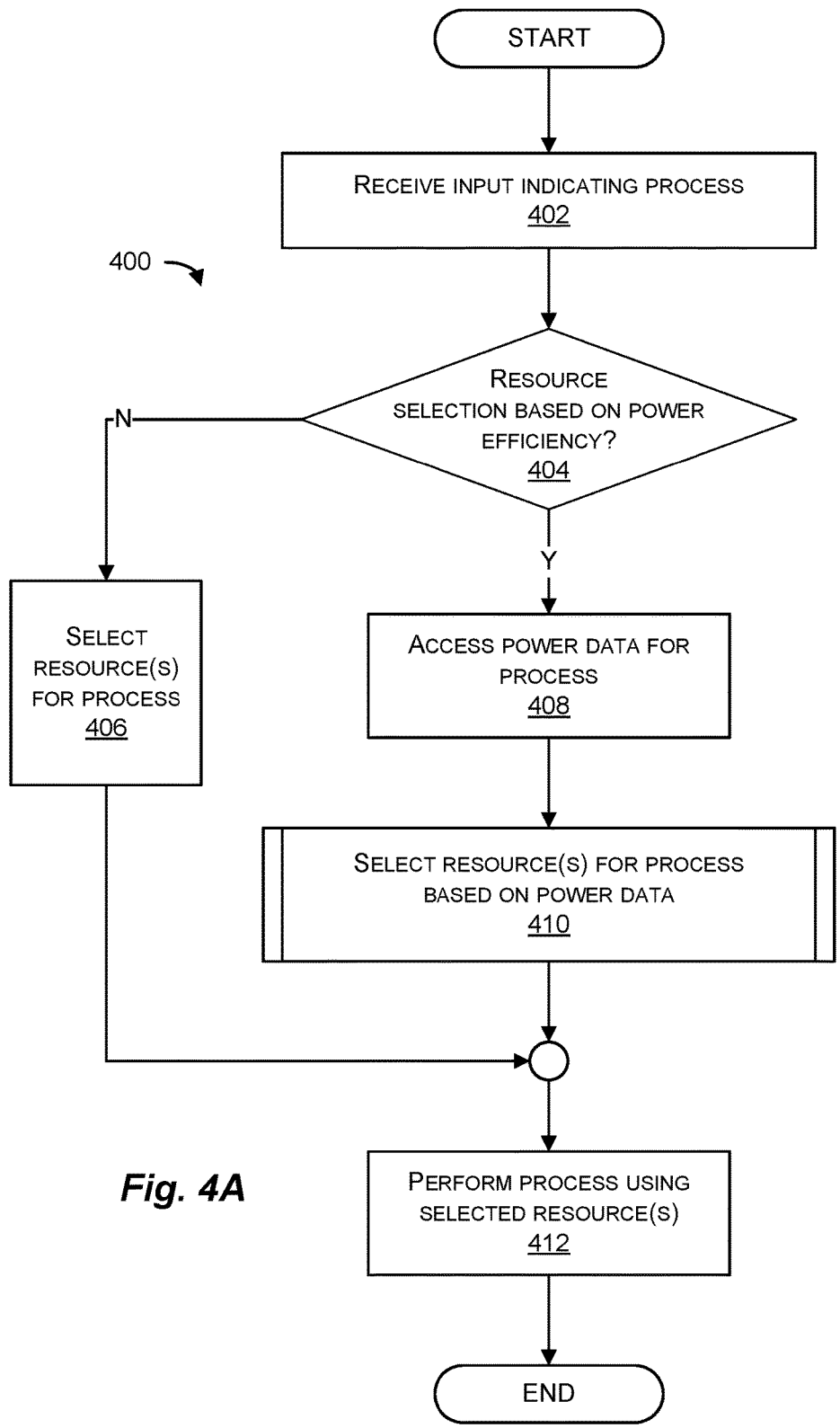
FIGS. 4A and 4B are flowcharts illustrating methods for selecting resources based on power consumption, according to one embodiment.

FIG. 4A is a flowchart of a method 400 illustrating selection of one or more resources, according to some embodiments. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 400 is described with reference to variations of the elements described in connection with FIGS. 1-3. In one implementation, at least a portion of method 400 can be implemented and/or performed by a file manager, such as file manager 202.

In element 402, a file manager receives input indicating a process. The process can be one of file operations processes, such as some type of backup of certain data. The input can indicate various characteristics of this process, such as a selection policy (e.g., whether it is based on power efficiency), a process type (e.g., backup (including backup type, such as full, incremental, periodic, etc.)), a desired execution time (such as immediate execution, execution in the next few hours, days, etc., among other alternatives). If the process indicates a power-efficient policy, the desired characteristics can also include maximum power usage (e.g., the power used by the process cannot exceed 100 Watts (W)), minimum acceptable power usage (e.g., any resource allocation that uses 50 W of power for process execution is acceptable), and the like. The input can also indicate a $CO_2$ emission threshold of the process.

In one implementation, the input can also indicate that only the efficiencies of the hardware resources are to be considered, regardless of any efficiency of the software resources. This partial power efficiency requirement is useful, for example, in situations where there's only one backup software application that is available, or where any efficiency differences between various software applications are negligible, or simply to be ignored. In another implementation, the input can indicate that the efficiency of the hardware resources is to have a certain weight, such as 75%, whereas the efficiency of the software resources is to have another weight, such as 25%, for when the resource selection is being performed.

In element 404, the file manager determines whether the input indicates a power-efficient resource selection. As described above, the input can include a policy indicating a type of resource selection. If the input indicates a power-efficient resource selection, element 408 is performed next. If the input indicates a non-power-efficient resource selection, element 406 is performed next.

In element 406, the file manager selects resources based on characteristics other than power efficiency. As described above with reference to FIG. 2, the file manager can select resources based on oldest available resource (such as using a FIFO queue), a round-robin resource selection, resource location, available network bandwidth available to a computing device executing the application selection for the process, and/or free storage space on media devices (such as if the process is a backup), among others.

In element 408, the file manager accesses power data. The power data can be stored using one or more databases, such as a power database and/or a process database. In one implementation, at least a portion of the power data can be cached (and thus accessed faster). The cached power data can be stored using the same computing device used to execute the file manager.

In element 410, the file manager selects resources based on power efficiency. The file manager can select the most power efficient resource(s), such as based on the desired power characteristics (e.g., as specified by the input). In one implementation, the file manager can generate a resource score associated with each resource, and then select the resource(s) with the best resource score. One such implementation using resource scores is described below with reference to FIG. 4B. However, other characteristics (such as described above) can also be accounted for during resource selection (i.e., instead of or in addition to the power efficiency).

For example, resources can be selected based on their projected $CO_2$ emissions. In one implementation, the file manager can perform various statistical analysis on the power data to determine projected power and/or electricity usage, $CO_2$ emissions, etc., of each resource. The file manager can apply weight to each desired characteristic (e.g., 25% for power usage, 25% for $CO_2$ emissions, 50% to overall cost of usage based of time of day) for each resource. Furthermore, the file manager can apply weights to various types of resources, such as 75% to hardware resources and 25% to software resources. The file manager can calculate the overall scores for each resource then select the most suitable resource(s).

In element 412, the process is performed using the selected resources. For example, the process can be performed by executing a backup application (e.g., application 208(1)) by a selected computing device (e.g., resource 218(2)). The selected backup application 208(1) can perform a backup of selected data onto media devices (e.g., such as also selected by the file manager). Although the selected resources are used in a similar fashion regardless of the selection process (i.e., whether they were selected based on power efficiency), the file manager can perform additional steps when the resource selection is based on power efficiency.

These additional steps include collecting (e.g., via software and/or hardware agent(s)), analyzing, and storing consumed power data, including updating the power data (such as described below with reference to FIG. 5). However, in one implementation, the additional steps of collecting consumed power data is also performed when resources are selected without considering power efficiency, such as to collect a greater sample of power data for analysis.

Figure 4B:
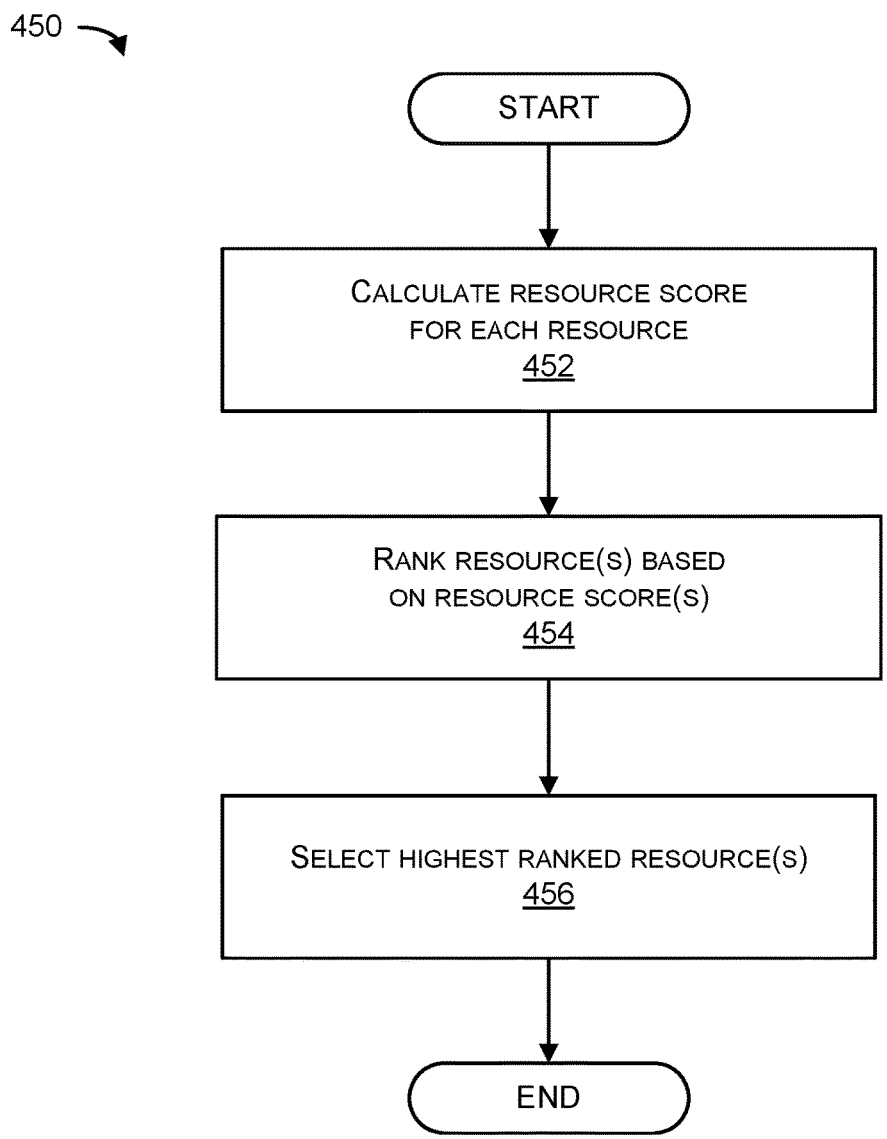

FIG. 4B is a flowchart of a method 450 illustrating selection of one or more resources, according to some embodiments. As with other method figures presented herein, and as will be appreciated in light of the present disclosure, this method may be modified in order to derive alternative embodiments. In one implementation, method 450 implements element 410 of FIG. 4A. At least a portion of method 400 can be implemented and/or performed by a file manager, such as file manager 202.

In element 452, the file manager calculates a resource score for each resource. In one implementation, the resource score is fully (or substantially fully) based on the power efficiency of each resource. In one implementation, the resource score includes a number from 0-100 (such as where a score of 10 indicates a very poor power efficiency, and a score of 90 indicates a very high power efficiency), but other implementations are completed. The resource score can be, for example, generated according to the total power use, power use per unit of time, power loss from each resource, etc. The resource score can also be a function of a time of day. For example, a certain resource can have a score of 50 during peak hours of 6-8 pm, and a score of 80 during an off-time of 4 am.

It is noted that the application manager can calculate a resource score for software and/or hardware resources. Furthermore, each resource can have a different power score depending on the selected process. For example, one software application can have a score of 80 for a backup process, but only a score of 50 for a data recovery process. This discrepancy can be caused, for example, by the number of data accesses (by that application) involved, the time of computation and/or other factors. In other words, different software applications can be optimized for different goals. Furthermore, a media device (i.e., a hardware resource) can have a resource score of 80, which can be further broken down into a resource score of 95 for data reads, but only a score of 65 for data writes (in this case the score of 80 can be a combined, or average, resource score). In one embodiment, the application can forecast the number of data reads and/or writes from/to each media device, and then determine (such as by estimating) the total power that might be expected to be used by each resource for the selected process.

In some embodiments, the file manager assigns a weight for each characteristic (such as power efficiency). The weight assigned to each characteristic can be determined automatically, it can be specified by the input (i.e., by the request), or it can be specified by the policy (e.g., as accessed by a policy manager). For example, a certain policy can indicate that the power efficiency for software resources should be assigned 75% weight, and the other 25% be equally divided between other characteristics. This policy can also indicate that the hardware power efficiency should be assigned 50%, with the network bandwidth assigned 25%, and the amount of free space available assigned 25%.

As noted, the file manager can also account for the best time of day into the resource scores, as allowable by the policy (i.e., the policy can indicate that a backup has to be performed within 12 hours after the backup request is received). The file manager can also make the selection based on a single characteristic, as indicated by the input. For example, the file manager can make the selection based solely on $CO_2$ emissions of each resource, such as to minimize the carbon footprint of the selected process.

In element 454, the file manager ranks the resource(s) based on the resource score(s). The file manager can rank the software and the hardware resources separately, such that applicable applications (i.e., applications that are configured to perform the selected process) are ranked from the highest (i.e., the most power efficient) to the lowest (i.e., the least power efficient). The hardware resources can be ranked in similar fashion.

In element 456, the file manager selects the highest ranked resource(s) based on the ranking scores. The file manager can select the highest ranked application as well as the highest ranked hardware resources for use with that application. In one embodiment, the file manager selects a different type and/or number of hardware resources for each process type and/or application. For example, an application that performs a backup process may use a different type and/or number of hardware resources from another application that performs a snapshot; and a different type and/or number of hardware resources from yet another application that performs a data recovery process.

Figure 5:
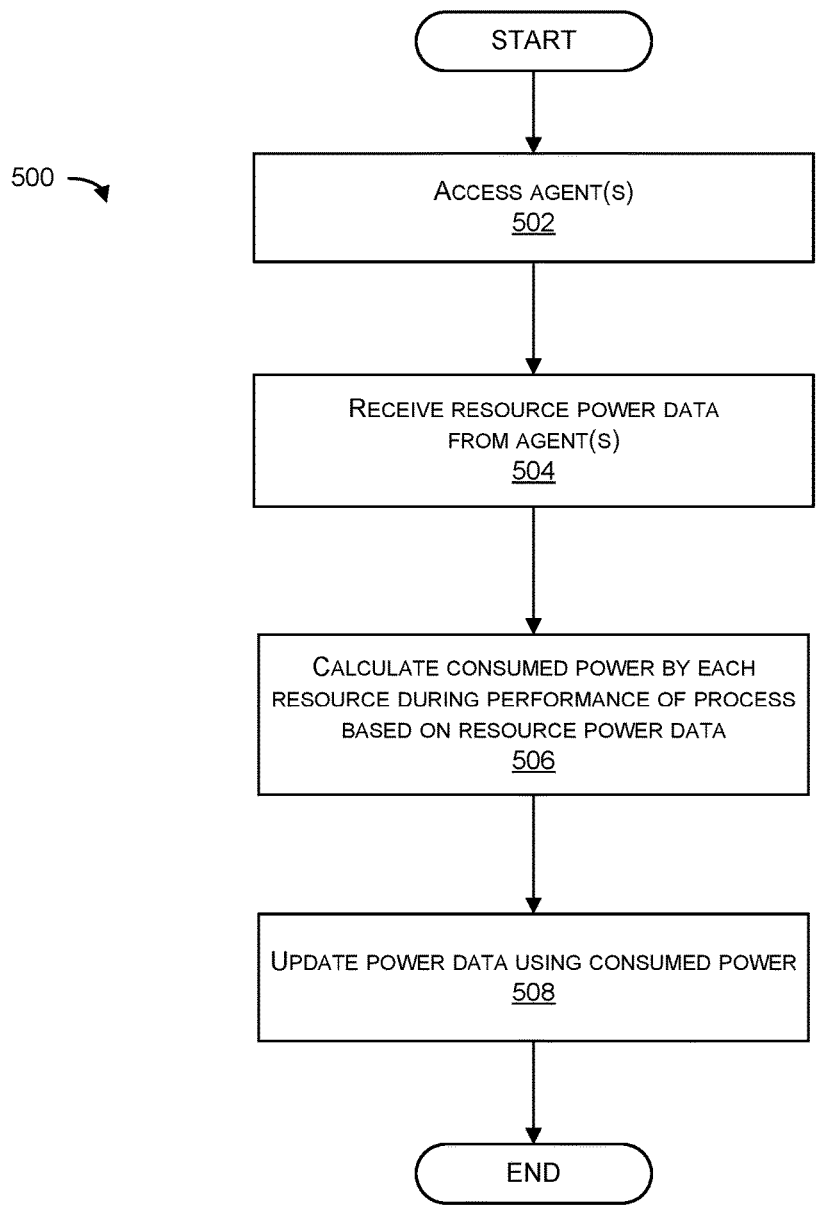
FIG. 5 is a flowchart of a method for updating power data, according to one embodiment.

FIG. 5 is a flowchart of a method 500 illustrating updating of power data, according to some embodiments. As will be appreciated in light of the present disclosure, this method may be modified in order to derive alternative embodiments. Also, the steps in this embodiment are shown in sequential order. However, certain steps may occur in a different order than shown, certain steps may be performed concurrently, certain steps may be combined with other steps, and certain steps may be absent in another embodiment. Method 500 is described with reference to variations of the elements described in connection with FIGS. 1-3. In one implementation, at least a portion of method 500 can be implemented and/or performed by an file manager, such as file manager 202.

In element 502, the file manager accesses one or more agents. Each agent can be a software program that gathers power consumption data by a resource during performance of a certain process. For example, one agent can measure the consumed power by an application that executes on a computing device. Another agent can measure the consumed power by a computing device when communicating with media devices. Yet another agent can measure the consumed power by media devices when performing various data/file operations, such as reads and writes. As noted, agents can be used regardless of whether power efficiency is used for resource selection. The agents can measure the following metrics of the resources:

1) Power input of a computing device/media device;
2) The operating system, and other software applications being executed by each computing device;
3) Architecture—the number of processing cores (of a processor), cache, memory etc., of each computing device;
4) Virtualization—whether virtualization environments are used by each computing device;
5) Events and/or clock gating per processor core—some lower level metrics of each computing device;
6) Other hardware—related metrics.

As noted, each agent also can record the time of the day for each measurement. As a result, the file manager can determine the cost of power use, such as depending on the billing rate of electricity (which typically varies on the time-of-day).

In element 504, the file manager receives consumed power data from the agent(s). In one implementation, the consumed power data received from the agents is raw power data, i.e., it is not yet processed or normalized (such as to fit the actual process performance time). The raw power data can be normalized, for example, to numerical values (such as between 0 and 100) to correspond to the scale of power data received from other resources.

In element 506, the file manager calculates consumed power that is consumed by each resource during the performance of the process. This calculation of consumed power is based on the consumed power data received from the agent(s). The calculation can involve normalizing the consumed power data to the actual execution time. Furthermore, the file manager can calculate the total power that is consumed by a software application, including the power consumed by the hardware resources used by that software application.

For example, the file manager can calculate the total power consumed by a backup application that was executed by computing device 104(1), that accessed media devices that were coupled to computing device 104(2). In one implementation, such calculation can involve a summation of power consumed by the processor, by memory, by peripherals, by board, and by hard drive(s) (or other local storage media) of each computing device, in addition to the power consumed by the media devices that store the data being operated on by the selected process. For example, the total power can be calculated as:

Total Power=(Sum of power used by processors of computing devices 104(1) and 104(2))+(Sum of power used by physical memory of computing devices 104(1) and 104(2))+(Sum of power used by network devices and other devices used by computing devices 104(1) and 104(2))+(Sum of power used by media devices performing storage operations by computing device 104(2))+(Sum of power used by processors of computing devices 104(1) and 104(2)).

The file manager can also analyze the power used, such as determining the power consumed by a certain application (such as by comparing the power consumed by a certain computing device when executing a first application to perform a certain process, versus the same computing device executing a second application to perform the same process).

In element 508, the file manager updates the power data using the consumed power calculated using element 506. The file manager can update the power data of the power database and/or the process data.

Figure 6:
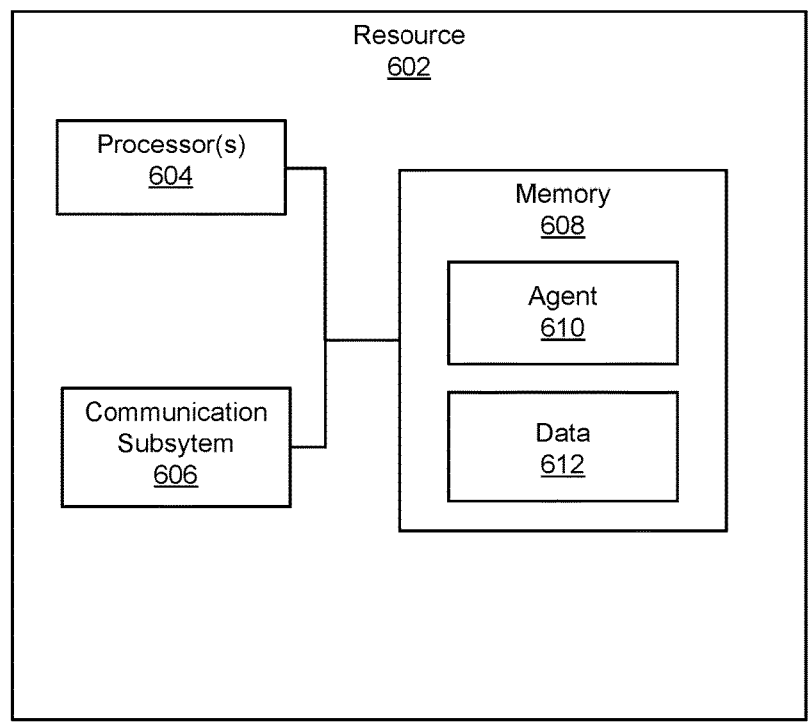
FIG. 6 is a block diagram illustrating example resources, according to some embodiments.

FIG. 6 is a block diagram illustrating of resource 602, such as a hardware resource of resources 218(1)-218(n), according to one or more embodiments. Resource 602 includes one or more processor(s) 604, a communication subsystem 606, and memory 608. Memory 608 can include an operating system (not shown) and an agent 610 (which can implement agent 210). Processor(s) 604 can execute agent 610, such as to collect consumed power data 612 for resource 602. Agent 610 can transmit data 612 to a file manager. It is noted that in some implementations, agent 610 can also collect (e.g., monitor and store) consumed power data for other resources (as some resources may be unable to execute agents) including media devices.

Figure 7:
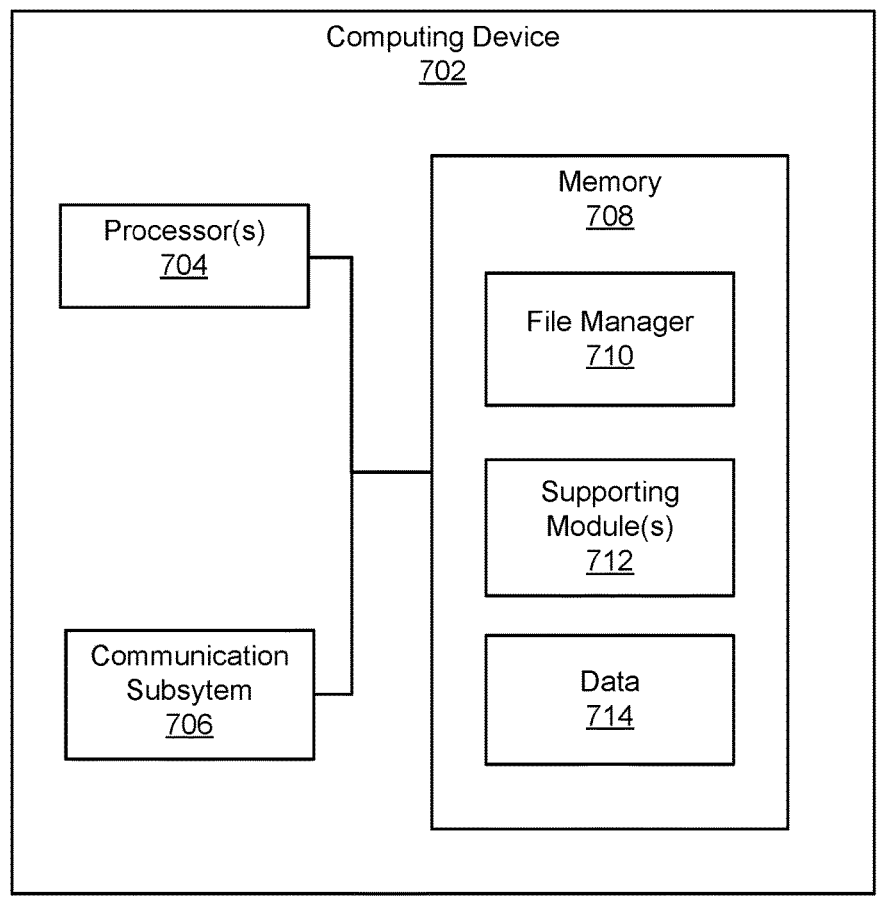
FIG. 7 is a block diagram illustrating an example computing device, according to one embodiment.

FIG. 7 is a block diagram of a computing device 702, such as computing device 102 and/or 104(1)-104(n), according to one or more embodiments. Node 702 includes one or more processor(s) 704, a communication subsystem 706, and memory 708. Memory 708 can include one or more of operating system (not shown), file manager 710, supporting module(s) 712, and data 714. Processor(s) 704 can execute one or more of operating system, file manager 710, and/or supporting modules 712. Communication subsystem 706 can facilitate communication with other computing devices and/or resources over a network.

File manager 710 can implement file manager 110, file manager 202, and/or file manager 300, and can implement one or more of methods 400-500. Supporting modules 712 can implement one or more modules shown in FIGS. 2 and 3, such as the policy manager, the process scheduler, the power manager, the resource manager, and the media manager, among others. Data 714 can implement resource scores 216, node power database 212 and/or process database 214. Depending on the implementation, data 714 can also implement various other data and/or information used by the file manager, including data received from agents before it is processed by file manager 710. It is noted that in some embodiments, one or more of elements of computing device 702 may not be used. In some embodiments, one or more of elements of computing device 702 may be combined, as desired.

Elements of network architecture can be implemented using different computer systems and networks. An example of one such network environment is described below with reference to FIG. 8.

Figure 8:
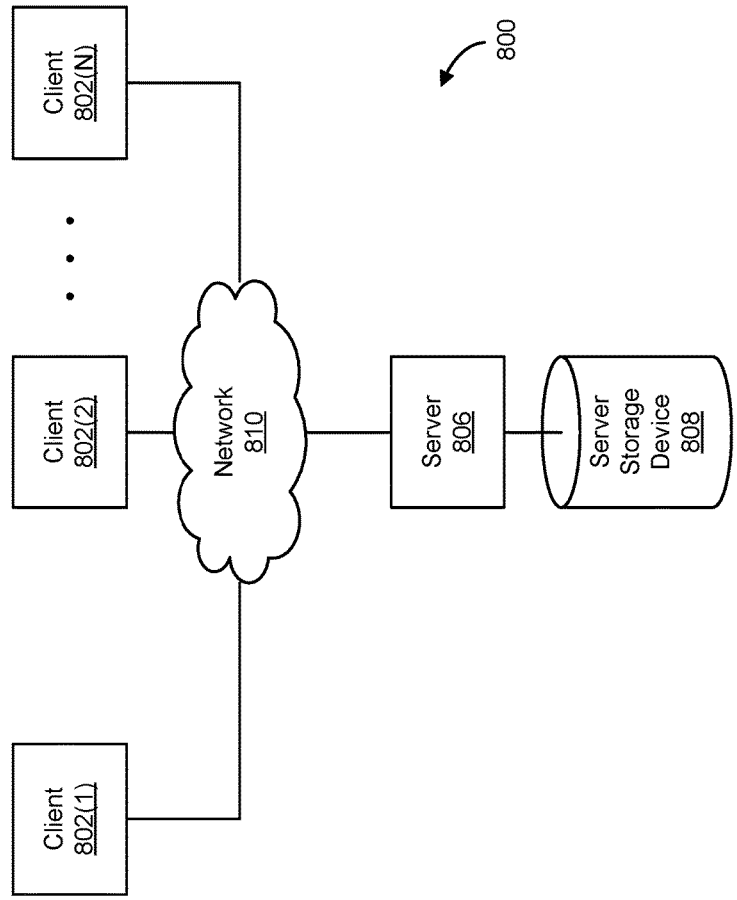
FIG. 8 is a block diagram illustrating a network architecture in which embodiments of the present application can be implemented.

FIG. 8 is a simplified block diagram illustrating a network architecture 800 in which one or more clients are provided with access to a server via various network connections. As depicted in FIG. 8, clients 802(1)-(N) are coupled to a network 810, and so are able to access a server 806 (which can be used to implement computing devices of FIGS. 1 and 2 and/or hardware resources of FIG. 2) via network 810. Other servers (not shown) can be used instead to implement these computing devices and/or hardware resources of FIGS. 1-3. A client can be implemented using, for example, a desktop computer, a laptop computer, a workstation, a server, a cell phone, a smart phone, a network-enabled personal digital assistant (PDA), or the like. An example of network 810, which can be used by clients 802(1)-(N) to access server 806, is the Internet. Alternatively, access to server 806 can be provided by a local area network (LAN) utilizing Ethernet, IEEE 802.11x, or some other communications protocol. As will be appreciated, server 806 can be accessed by clients coupled directly thereto (not shown).

As also depicted on FIG. 8, server 806 is coupled to a server storage device 808, which includes a data volume such as database(s) 108 and databases 212 and 214, among others. Server storage device 808 can be implemented as a single storage device or a collection of storage devices. Server storage device 808 can also be implemented as a storage area network, which couples remote storage devices to a server (e.g., server 806), such that the remote storage devices appear as locally-attached storage devices to the server's OS, for example.

In light of the present disclosure, those of skill in the art will appreciate that server storage device 808 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 800 can include other components such as routers, firewalls and the like that are not germane to the discussion of the present network and will not be discussed further herein. Those of skill in the art will also appreciate that other configurations are possible. For example, clients 802(1)-(N) can be directly coupled to server storage device 808 without the user of a server or Internet; server 806 can be used to implement both the clients and the server; network architecture 800 can be implemented without the use of clients 802(1)-(N); and so on.

As an example implementation of network architecture 800, server 806, services requests to data generated by clients 802(1)-(N) to data stored in server storage device 808. Any of the functionality of the computing devices and/or file managers can be implemented using one of the other servers in the manner illustrated by FIGS. 1-3.

Figure 9:
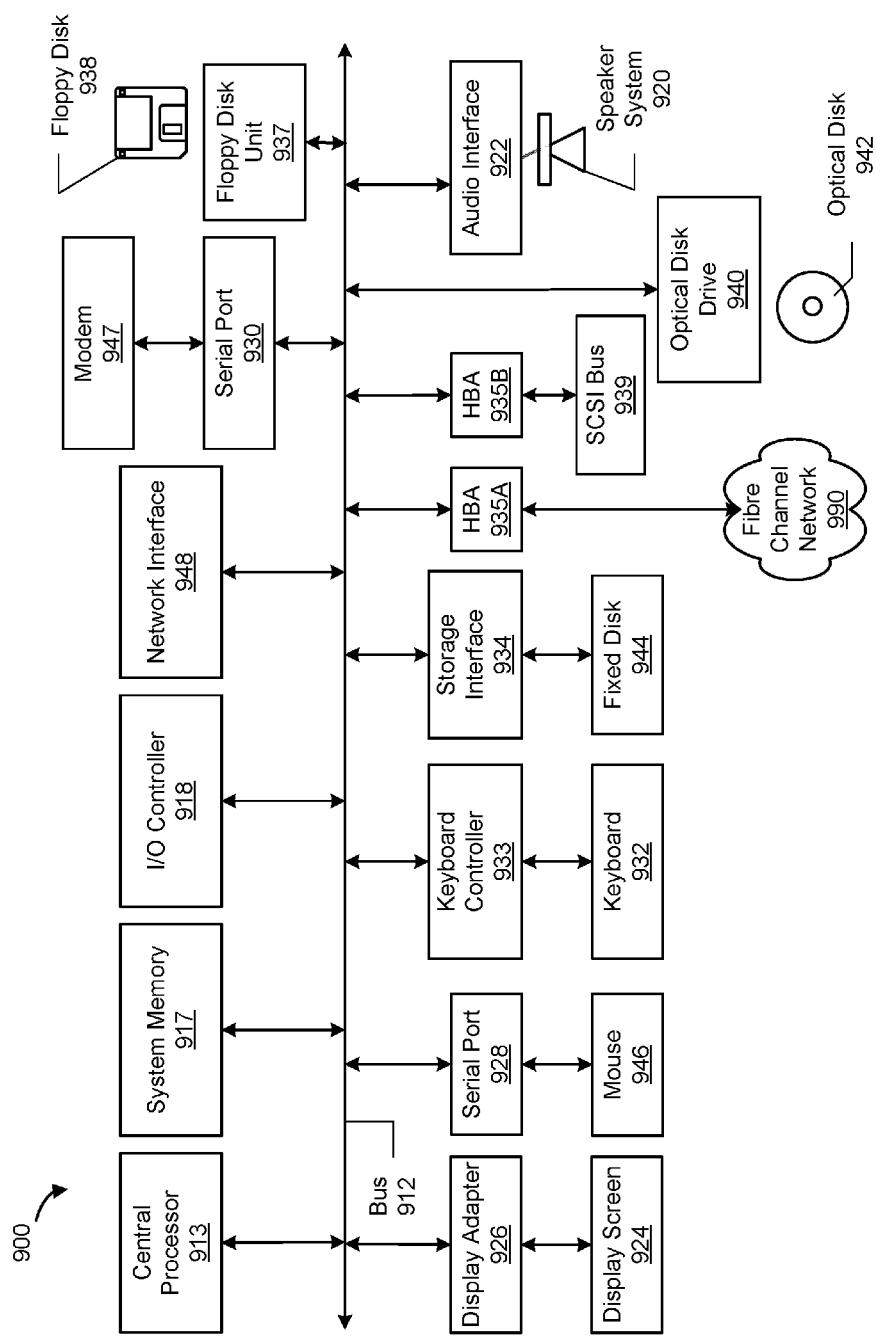
FIG. 9 is a block diagram that illustrates an example of a computer system suitable for implementing embodiments of the present application.

FIG. 9 depicts a block diagram of a computer system 910 suitable for implementing the present disclosure. Computer system 910 may be illustrative of various computer systems in the networked system of FIG. 1, such as node(s) and/or storage node(s), among others. Computer system 910 includes a bus 912 which interconnects major subsystems of computer system 910, such as a central processor 913, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 913 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code for selecting resources for power-efficient file operations (such as described above with reference to the methods of FIGS. 4-5), etc., to implement the present disclosure can be stored in computer-readable storage media such as one or more of system memory 917, fixed disk 944, optical disk 942, or floppy disk 938. Memory 920 is also used for storing temporary variables or other intermediate information during the execution of instructions by the processor 910. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, implemented in a computer system, comprising:
   identifying a backup process configured to be executed by the computer system, wherein
      the backup process is configured to be performed using, at least, a software resource and a hardware resource among a plurality of resources of the computer system;
   identifying at least a first metric and a second metric for the backup process, wherein
      the first metric indicates an amount of power consumed by the software resource with respect to the backup process, and
      the second metric indicates an amount of power consumed by the hardware resource with respect to the backup process;
   measuring the first metric and the second metric with respect to the backup process, wherein
      the measuring is performed by an agent executed by one or more processors of the computer system, and
      the measuring results in a measurement of the first metric and the second metric;
   sending a first message to a node, wherein
      the first message comprises
         information that identifies the backup process, and
         data representing the measurement of the first metric and the second metric;
   receiving a second message from the node, wherein,
      the second message comprises information identifying a selected software resource and a selected hardware resource that were individually selected from among the plurality of resources, wherein
         the selected software resource and the selected hardware resource were individually selected based, at least in part, on at least the information and the data, as evaluated with respect to each of the selected software resource and the selected hardware resource; and
   in response to receiving the second message, causing the backup process to be executed during a future time period by causing the selected hardware resource to execute the selected software resource.

2. The method of claim 1, wherein
   the data is configured to be stored in one or more databases, and
   the information is configured to be used to index the data in the one or more databases.

3. The method of claim 2, wherein
   the data comprises power data, and
   the power data represents power usage by at least one of the selected hardware resource and the selected software resource resulting from performance of the backup process using at least one of the selected hardware resource and the selected software resource.

4. The method of claim 3, wherein
   at least one of the first metric and the second metric further comprise at least one of
      power consumed by one or more of the one or more processors,
      power consumed by a computing device of the computer system,
      power consumed by a media device of the computer system, or
      power consumed by a storage device of the computer system.

5. The method of claim 3, wherein
   a third metric comprises at least one of
      an operating system metric,
      a software application metric, wherein the software application metric is applicable to a software application executed by the computer system,
      an architectural metric,
      a virtualization metric, or
      an event metric for the one or more processors.

6. The method of claim 1, wherein
   the data comprise one or more of
      power efficiency data, and/or
      carbon dioxide emission data.

7. The method of claim 1, wherein
   the backup process is configured to perform at least one operation of a plurality of operations.

8. The method of claim 7, wherein
   the selected software resource comprises an application configured to be used in performing the backup process and to be selected using, at least in part, one or more characteristics.

9. The method of claim 7, wherein
   the selected hardware resource comprises at least one of
      a computing device configured to execute an application, or
      one or more storage devices associated with a computing device.

10. The method of claim 1, further comprising:
   receiving another message, wherein
      the another message comprises received information,
      the another message indicates a selected resource, and
      the selected resource is an additional resource in addition to the selected hardware resource and the selected software resource; and
   using the selected resource to perform the backup process, at least in part.

11. The method of claim 10, wherein
   the received information comprises threshold data,
   the threshold data represents one or more thresholds that the performance of the backup process is to meet, and
   the received information is received from one or more of a plurality of agents.

12. The method of claim 10, further comprising:
determining consumed power data for the backup process, wherein
the consumed power data represents power consumed by the backup process; and
recording power consumption data for the backup process, wherein
the power consumption data represents power usage resulting from performance of the backup process during performance of the backup process, and
the power consumption data comprises the consumed power data.

13. The method of claim 10, wherein
the data comprises information indicating power efficiency of at least one of the selected hardware resource and the selected software resource at different times of day, and
at least one of the selected hardware resource and the selected software resource is selected based, at least in part, on the power efficiency associated with that selected resource.

14. The method of claim 1, further comprising
calculating a first weighted score and a second weighted score, wherein
the first weighted score is based, at least in part, on the information, the data, and a first weight,
the first weight is associated with the selected hardware resource,
the second weighted score is based, at least in part, on the information, the data, and a second weight,
the second weight is associated with the selected software resource, and
the first weight is not equal to the second weight.

15. The method of claim 14, wherein
at least one of the selected hardware resource and the selected software resource was further selected based on at least one of the first weighted score and the second weighted score.

16. A computer system comprising:
one or more processors;
a computer-readable storage medium coupled to the one or more processors; and
a plurality of instructions, encoded in the computer-readable storage medium and configured to cause the one or more processors to
identify a backup process configured to be executed by the computer system, wherein
the backup process is configured to be performed using, at least, a software resource and a hardware resource among a plurality of resources of the computer system,
identify at least a first metric and a second metric for the backup process, wherein
the first metric indicates an amount of power consumed by the software resource with respect to the backup process, and
the second metric indicates an amount of power consumed by the hardware resource with respect to the backup process,
measure the first metric and the second metric with respect to the backup process, wherein
the instructions configured to cause the one or more processors to measure are performed by an agent executed by one or more processors of the computer system, and
the instructions configured to cause the one or more processors to measure result in a measurement of the first metric and the second metric,
send a first message to a node, wherein
the first message comprises
information that identifies the backup process, and
data representing the measurement of the first metric and the second metric,
receive a second message from the node, wherein,
the second message comprises information identifying a selected software resource and a selected hardware resource that were individually selected from among the plurality of resources, wherein
the selected software resource and the selected hardware resource were individually selected based, at least in part, on at least the information and the data, as evaluated with respect to each of the selected software resource and the selected hardware resource, and
in response to receiving the second message, cause the backup process to be executed during a future time period by causing the selected hardware resource to execute the selected software resource.

17. The computer system of claim 16, wherein
the data is configured to be stored in one or more databases, and
the information is configured to be used to index the data in the one or more databases.

18. The computer system of claim 17, wherein
the data comprises power data, and
the power data represents power usage by at least one of the selected hardware resource and the selected software resource resulting from performance of the backup process using at least one of the selected hardware resource and the selected software resource.

19. The computer system of claim 16, wherein
the backup process is configured to perform at least one operation of a plurality of operations.

20. The computer system of claim 16, wherein the instructions are further configured to cause at least one processor of the one or more processors to:
receive another message, wherein
the another message indicates a selected resource, and
the selected resource is an additional resource in addition to the selected hardware resource and the selected software resource; and
using the selected resource to perform the backup process, at least in part.

21. The computer system of claim 20, wherein the instructions are further configured to cause at least one processor of the one or more processors to:
determine consumed power data for the backup process, wherein
the consumed power data represents power consumed by the backup process; and
record power consumption data for the backup process, wherein
the power consumption data represents power usage resulting from performance of the backup process during performance of the backup process, and
the power consumption data comprises the consumed power data.

22. A computer program product comprising:
a plurality of instructions, comprising
- a first set of instructions, executable on a computer system, configured to identify a backup process configured to be executed by the computer system, wherein
  - the backup process is configured to be performed using, at least, a software resource and a hardware resource among a plurality of resources of the computer system,
- a second set of instructions, executable on the computer system, configured to identify at least a first metric and a second metric for the backup process, wherein
  - the first metric indicates an amount of power consumed by the software resource with respect to the backup process, and
  - the second metric indicates an amount of power consumed by the hardware resource with respect to the backup process,
- a third set of instructions, executable on the computer system, configured to measure the first metric and the second metric with respect to the backup process, wherein
  - the third set of instructions are performed by an agent executed by one or more processors of the computer system, and
  - the third set of instructions results in a measurement of the first metric and the second metric,
- a fourth set of instructions, executable on the computer system, configured to send a first message to a node, wherein
  - the first message comprises
    - information that identifies the backup process, and
    - data representing the measurement of the first metric and the second metric,
- a fifth set of instructions, executable on the computer system, configured to receive a second message from the node, wherein,
  - the second message comprises information identifying a selected software resource and a selected hardware resource that were individually selected from among the plurality of resources, wherein
    - the selected software resource and the selected hardware resource were individually selected based, at least in part, on at least the information and the data, as evaluated with respect to each of the selected software resource and the selected hardware resource, and
- a sixth set of instructions, executable on the computer system, configured to cause, in response to receiving the second message, the backup process to be executed during a future time period by causing the selected hardware resource to execute the selected software resource; and
- a non-transitory computer-readable storage medium, wherein the instructions are encoded in the non-transitory computer-readable storage medium.

* * * * *